(12) United States Patent
Joseph et al.

(10) Patent No.: US 9,792,637 B2
(45) Date of Patent: Oct. 17, 2017

(54) SYSTEM AND METHOD OF DISPLAYING AN AUTOGRAPH OF THE ARTIST(S) OF THEIR SONG(S) ON AN ELECTRONIC DEVICE AND A METHOD FOR CUSTOMERS TO RESELL AUTOGRAPHED MP3/MP4 TYPE MUSIC FILES AND THE LIKE

(71) Applicants: Evans E. Joseph, Brooklyn, NY (US); Ivy R. Bittle, Brooklyn, NY (US)

(72) Inventors: Evans E. Joseph, Brooklyn, NY (US); Ivy R. Bittle, Brooklyn, NY (US)

(*) Notice: Subject to any disclaimer, the term of this patent is extended or adjusted under 35 U.S.C. 154(b) by 204 days.

(21) Appl. No.: 14/341,797

(22) Filed: Jul. 26, 2014

(65) Prior Publication Data

US 2016/0027081 A1 Jan. 28, 2016
US 2017/0228806 A9 Aug. 10, 2017

Related U.S. Application Data

(60) Provisional application No. 61/958,396, filed on Jul. 27, 2013.

(51) Int. Cl.
*G06F 21/10* (2013.01)
*G06Q 30/06* (2012.01)
*H04L 9/32* (2006.01)

(52) U.S. Cl.
CPC ........ *G06Q 30/0621* (2013.01); *G06F 21/10* (2013.01); *G06Q 30/0609* (2013.01); *H04L 9/3247* (2013.01)

(58) Field of Classification Search
CPC .. G06Q 30/06; G06Q 30/061; G06Q 20/1235; G06F 21/10; H04L 9/3247

USPC ........ 705/50–59, 80, 1.1, 14.16, 26.1, 26.7, 705/26.8, 26.81–30
See application file for complete search history.

(56) References Cited

U.S. PATENT DOCUMENTS

| | | | |
|---|---|---|---|
| 7,640,186 B1* | 12/2009 | Fraser | G06Q 20/401 705/26.35 |
| 8,131,648 B2* | 3/2012 | Barton | G06F 11/1417 705/37 |
| 8,583,031 B2* | 11/2013 | Rao | G06Q 30/02 455/3.05 |
| 8,583,693 B2* | 11/2013 | Steelberg | G06Q 30/02 707/796 |
| 8,880,602 B2* | 11/2014 | Dougherty | G06F 21/00 709/201 |
| 9,152,629 B1* | 10/2015 | Waters | G06F 17/30011 |
| 2001/0049648 A1* | 12/2001 | Naylor | G06Q 30/08 705/37 |
| 2004/0006519 A1* | 1/2004 | Lee | G06Q 30/0601 705/26.1 |
| 2004/0054694 A1* | 3/2004 | Piccionelli | G06Q 30/02 |
| 2005/0188424 A1* | 8/2005 | Kizyma | G06Q 30/06 726/26 |
| 2005/0216360 A1* | 9/2005 | Osterer | G06Q 10/087 705/26.1 |
| 2006/0010075 A1* | 1/2006 | Wolf | G06Q 30/06 705/57 |

(Continued)

*Primary Examiner* — Joshua Kennedy
(74) *Attorney, Agent, or Firm* — Liang, Frank & King LLP; Brian E. Hennessey

(57) ABSTRACT

A method and system of displaying an autograph of the artist(s) of their song(s) on an electronic device and a method for customers to resell autographed MP3/MP4 type music files and the like.

20 Claims, 4 Drawing Sheets

(56) References Cited

U.S. PATENT DOCUMENTS

| | | | |
|---|---|---|---|
| 2013/0117665 A1* | 5/2013 | Tagliaferri | G06F 17/24 715/255 |
| 2014/0156463 A1* | 6/2014 | Hui | G06Q 30/0621 705/26.61 |
| 2015/0186983 A1* | 7/2015 | Gandhi | G06Q 30/0641 705/27.1 |
| 2015/0235013 A1* | 8/2015 | Sundaresan | G06Q 30/0206 705/7.35 |

* cited by examiner

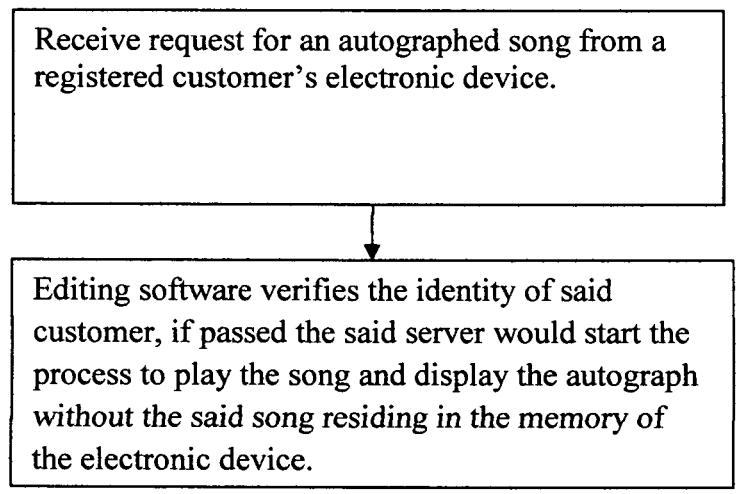
40         Fig. 3

```
┌─────────────────────────────────┐
│ The registered customer can resell their │
│ autographed song.               │
└─────────────────────────────────┘
                │
                ▼
┌─────────────────────────────────┐
│ The registered customer can resell their │
│ autographed song to a prospect of their │
│ own or select a buyer that resides in the │
│ potential customers waiting queue │
│ database.                       │
└─────────────────────────────────┘
                │
                ▼
┌─────────────────────────────────┐
│ A transference of a license will take │
│ place.                          │
└─────────────────────────────────┘
                │
                ▼
┌─────────────────────────────────┐
│ The editing software will authenticate the │
│ autographed MP3/MP4 type music file │
│ and the like, before it is resold. │
└─────────────────────────────────┘
```

SYSTEM AND METHOD OF DISPLAYING AN AUTOGRAPH OF THE ARTIST(S) OF THEIR SONG(S) ON AN ELECTRONIC DEVICE AND A METHOD FOR CUSTOMERS TO RESELL AUTOGRAPHED MP3/MP4 TYPE MUSIC FILES AND THE LIKE

CROSS REFERENCE TO RELATED APPLICATIONS

This application is claiming the benefit and filing date of Jul. 27, 2013 previously filed provisional application with the application No. 61/958,396.

FEDERALLY SPONSORED RESEARCH

Not Applicable

SEQUENCE LISTING

Not Applicable

FIELD OF INVENTION

The present invention encompasses the music industry. More particularly the invention pertains to a method and system for displaying an autograph of the artist of their song playing in electronic devices, such as tablet PC's, smart phones, personal computers, digital music player devices and the like enabling these devices to display artist's autograph(s) of their song(s) being played, and a method for customers to resell autographed MP3/MP4 type music files and the like.

BACKGROUND OF THE INVENTION

Electronic devices such as smart phones, tablet PC's, digital music player devices, personal computers and the like are readily available today. Due to the expansion of these electronic devices there is a growing trend with digital audio streaming services providing subscribers with apps to manage music via the Internet for such devices. Many digital music player devices have become very popular worldwide due to their convenience, hand held size and capability of downloading music from the Internet.

The field of autograph collection is popular among artist's fans. Fans like to purchase memorabilia in the form of personalized items.

The music industry currently has a method of displaying the title and words of songs on digital music player devices and the like. However there is not a way to display the autograph(s) of the artist of the song being played on an electronic device.

In addition the secondary market for reselling of a MP3/MP4 music type file has a challenge in not knowing if the used MP3/MP4 file being sold is the original file and that other copies were not produced.

Therefore, due to the limitations described above there is a need for a method and system for displaying an autograph of the artist of their song playing in an electronic device and a method for customers to resell autographed MP3/MP4 type music files and the like.

BRIEF SUMMARY OF THE INVENTION

Accordingly, what is needed is a method and system of displaying an autograph of the artist(s) of their song(s) on electronic devices and a method for customers who wish to resell autographed CD, DVD, or MP3/MP4 type music files and the like.

Another object of the invention is to increase sales for the artists and music industry.

Yet another object of the invention is to create a demand by offering limited edition autographed CD, DVD, or an MP3/MP4 type music files and the like, making it a novel collector's item of memorabilia.

Yet another object of the invention is to provide a way to add value to the autographed CD, DVD, or MP3/MP4 type music files and the like by allowing customers to bid on available limited edition autographed CD, DVD, or MP3/MP4 type music files and the like owned by registered customers processed through our resale program.

BRIEF DESCRIPTION OF THE DRAWINGS

The invention will be better understood from a reading of the following detailed description taken in combination with the appended drawings, in which like reference designators are used to identify like elements, and in which:

FIG. 3 is an operational flow diagram of the invention.
FIG. 4 is an operational flow diagram of the invention.

DESCRIPTION OF THE INVENTION

A method and system for displaying on autograph of the artist of their song playing in an electronic device and a method for customers to resell autographed MP3/MP4 type music files and the like according to the present invention will now be described with reference to FIGS. 1 through 4 of the accompanying drawings.

The invention will be described in terms of specific embodiments of the invention. It will be apparent, however, those of ordinary skill in the art will recognize that other elements and/or steps are desirable and/or required in implementing the present invention. On the other hand, because such elements and steps are well known in the art, and because they do not facilitate a better understanding of the present invention, a discussion of such elements and steps is not provided herein. In addition certain sections of the invention are not disclosed due to trade secrets. The invention herein is directed to all such variations and modifications to such elements and methods known to those skilled in the art. Yet further the foregoing embodiments identified are therefore to be considered in all respects illustrative only, and are not meant to be exclusive or limited in their description of the present invention.

Figure 1:
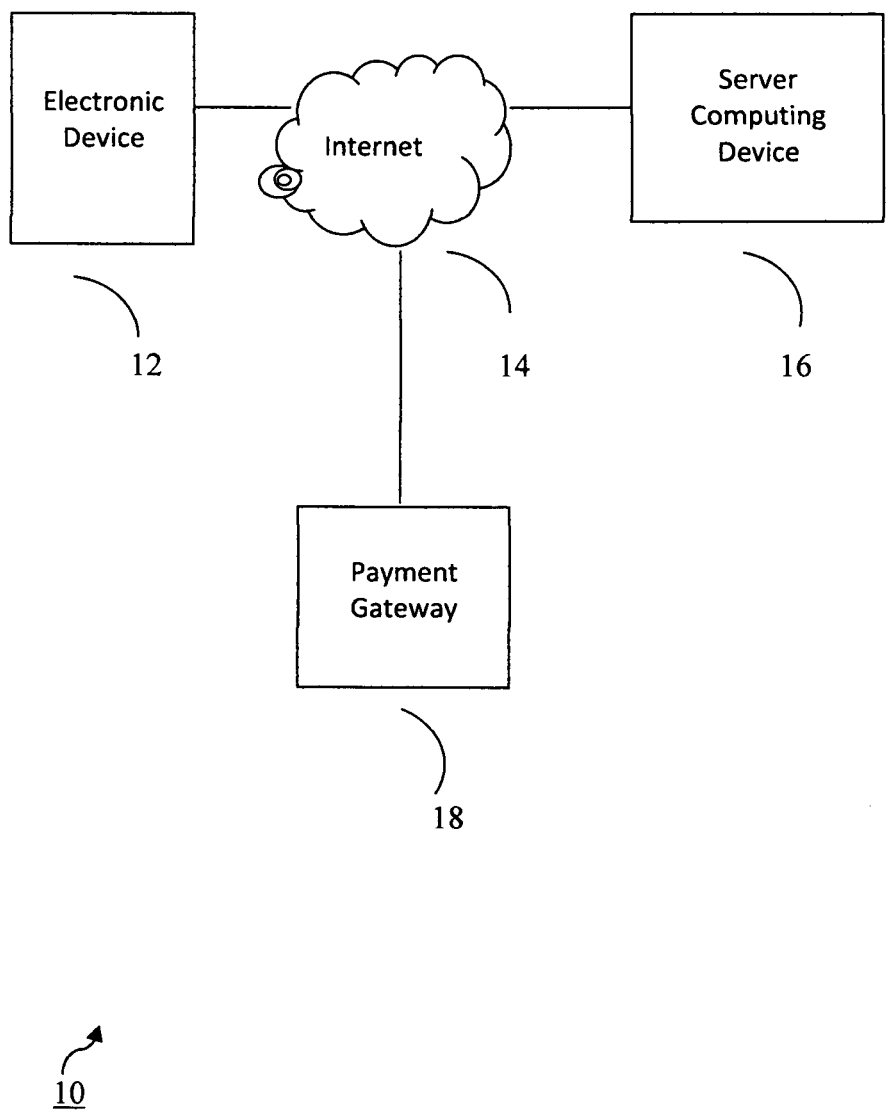
FIG. 1 is a block diagram of a system overview.

FIG. 1 is a block diagram of the system (10) for displaying an autograph of the artist(s) of their song(s) on an electronic device and a method for customers who wish to resell autographed MP3/MP4 type music files and the like. The system (10) includes an electronic device (12) such as a smart phone, tablet PC, personal computer, digital music player device, etc., a communications network (14) such as the Internet, a server computing device (16) or it may contain a plurality of servers and a payment gateway (18).

Figure 2:
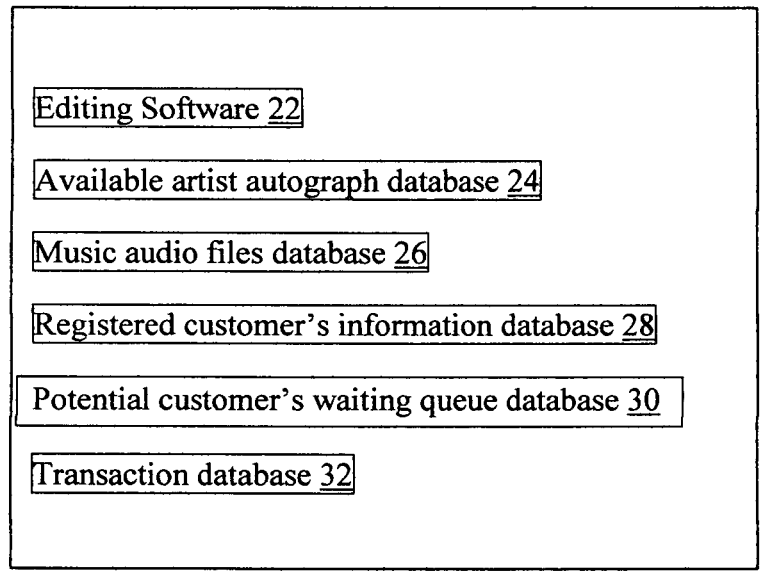
FIG. 2 is block diagram of a storage device.

FIG. 2 is a block diagram of the storage device (20) which depicts several databases which may include an editing software (22), available artists autograph database (24), music audio files database (26), a registered customer's information database (28), a potential customers waiting queue database (30), and a transaction database (32). Each database is described herein. It will be readily apparent to one of ordinary skill in the art that more or less databases as well as different types of databases may be stored by the storage device (20).

The editing software (22) has various functionality, it is an overall managing program for the server computing device (16). For example, the editing software (22) can determine if the number of autographed songs or albums sold of a particular artist has reached the limited edition number specified for that artist, track customer ID's and purchases, and so on.

The artists' signatures may be recorded in many known manners, such as by using a digital signature capture device. For example, an attorney may witness the artist's signing the digital signature capture device which can be sent remotely to the server computing device (16). The editing software (22) captures the signature and authenticates it, then places it in the available Artist autograph database (24) containing identifier codes.

A prospect who would like to purchase an autographed song can use an electronic device (12) to download an app, affiliated with the invention herein via the communications network (14), to log into the server computing device (16) and once payment is processed through the payment gateway (18) the prospect becomes a registered customer.

FIG. 3 is an operational flow diagram (40) of a method for displaying an autograph of the artist(s) of their song(s) on an electronic device. The server computing device (16) receives a request for an autographed song from a registered customer's electronic device (12). The server computing device (16) containing an editing software (22) with means to verify the identity of said customer, if passed as a registered customer, said editing software (22) retrieves said customer's requested song choice from a preselected database and would start the process to play the song and display the autograph on the registered customer's electronic device without said song residing in the memory of the electronic device (12).

FIG. 4 is an operational flow diagram (50) of a method for the registered customer to resell their autographed song. The registered customer can have with their own buyer which has to become a registered customer or select a buyer who resides in the potential customers waiting queue database (30). A transference of a software license will take place. The editing software (22) will authenticate the autographed MP3/MP4 type music file and the like before it is resold.

Although several embodiments of the invention have been illustrated and described, it will be apparent to those skilled in the art that various changes and modifications may be made therein without departing from the spirit of the invention or from the scope of the appended claims.

What is claimed is:

1. A server system for providing an autograph image file associated with an electronic audio file, comprising:
   a software editor module adapted to verify an identity of a user;
   an electronic audio file database electronically coupled to the software editor and including the electronic audio file;
   an autograph image file database electronically coupled to the software editor and including the associated autograph image file; and
   a play module adapted to communicate the electronic audio file and the associated autograph image file to an electronic device of the user when the software editor module verifies the user as a registered customer, the play module being adapted to cause the electronic device to play the electronic audio file and concurrently display the associated autograph image file, the electronic audio file and the associated autograph image file not being stored in a memory of the electronic device.

2. The server system of claim 1, wherein the software editor module is further adapted to authenticate the electronic audio file and the associated autograph image file.

3. The server system of claim 1, wherein the software editor module is further adapted to determine if a number of the electronic audio files and the associated autograph image files sold of a related artist equals a specified limited edition number for the related artist.

4. The server system of claim 1, further comprising a transaction database electronically coupled to the software editor and including a record of transactions relating to the electronic audio file and the associated autograph image file.

5. The server system of claim 4, wherein the software editor module is further adapted to track customer purchases.

6. The server system of claim 1, wherein the software editor module is further adapted to track customer identification information.

7. The server system of claim 1, wherein the play module is further adapted to communicate a software application to the electronic device of the user to enable the electronic device to play the electronic audio file and concurrently display the associated autograph image file without storing the electronic audio file and the associated autograph image file in the memory of the electronic device.

8. The server system of claim 1, wherein, when a payment is processed through a payment gateway electronically coupled to the server system, the user becomes the registered customer.

9. The server system of claim 8, wherein when the software editor module verifies the user, the software editor module determines that the user is the registered customer.

10. The server system of claim 8, further comprising a registered customer's information database electronically coupled to the software editor.

11. The server system of claim 1, further comprising a potential customers database electronically coupled to the software editor and including a queue of potential customers waiting to purchase a license to the electronic audio file and the associated autograph image file.

12. A method for providing an autograph image file associated with an electronic audio file, comprising:
    receiving a request from a user to play the electronic audio file and display the associated autograph image file;
    verifying by a software editor module an identity of the user as a registered customer;
    accessing, by the the software editor, an electronic audio file database including the electronic audio file;
    accessing, by the the software editor, an autograph image file database including the associated autograph image file; and
    communicating, by a play module operating on a computer server, the electronic audio file and the associated autograph image file to an electronic device of the user, the play module being adapted to cause the electronic device to play the electronic audio file and concurrently display the associated autograph image file, the electronic audio file and the associated autograph image file not being stored in a memory of the electronic device.

13. The method of claim 12, further comprising authenticating by the software editor module the electronic audio file and the associated autograph image file.

14. The method of claim 12, further comprising determining, by the software editor module, if a number of the electronic audio files and the associated autograph image files sold of a related artist equals a specified limited edition number for the related artist.

15. The method of claim 12, wherein a transaction database is electronically coupled to the software editor and includes a record of transactions relating to the electronic audio file and the associated autograph image file.

16. The method of claim 12, further comprising tracking, by the software editor module, customer identification information.

17. The method of claim 12, further comprising tracking, by the software editor module, customer purchases.

18. The method of claim 12, further comprising communicating, by the play module, a software application to the electronic device of the user to enable the electronic device to play the electronic audio file and concurrently display the associated autograph image file without storing the electronic audio file and the associated autograph image file in the memory of the electronic device.

19. The method of claim 12, further comprising:

selling by the registered customer a license to the electronic audio file and the associated autograph image file;

transferring the license to a new registered customer; and authenticating, by the editing software module, the electronic audio file and the associated autograph image file.

20. The method of claim 19, further comprising one of:

selecting a buyer by the registered customer and registering by the buyer to become the new registered customer; and selecting by the registered customer, from a potential customers database electronically including a queue of potential customers waiting to purchase the license, the new registered customer.

* * * * *